US005750181A

United States Patent [19]
Greff

[11] Patent Number: 5,750,181
[45] Date of Patent: May 12, 1998

[54] PREPARATION OF FRESH COMMINUTED ONIONS

[76] Inventor: Gary S. Greff, 3rd St. E. Box 184, Regent, N. Dak. 58650

[21] Appl. No.: 631,541

[22] Filed: Apr. 12, 1996

[51] Int. Cl.$^6$ .................. A23B 7/10; A23L 1/05
[52] U.S. Cl. .................. 426/615; 426/321; 426/327; 426/524; 426/532; 426/541; 426/573; 426/626; 426/654
[58] Field of Search .................. 426/615, 327, 426/541, 321, 532, 524, 573, 654, 626

[56] References Cited

U.S. PATENT DOCUMENTS

| | | | |
|---|---|---|---|
| 4,370,354 | 1/1983 | Leipold | 426/573 |
| 4,448,778 | 5/1984 | Lynch | 426/573 |
| 4,752,489 | 6/1988 | Wallace | 426/573 |

OTHER PUBLICATIONS

Hawley. G. 1987. The Condensed Chemical Dictionary. Van Nostrand Reinhold Co., N.Y., p. 940.

*Primary Examiner*—Helen Pratt
*Attorney, Agent, or Firm*—David A. Lingbeck

[57] ABSTRACT

Fresh comminuted onions may be stored in container in refrigerated conditions at approximately 4 degrees Celsius for relatively long periods of time without decomposition to the onions which are prepared by mixing the comminuted onions with certain ingredients comprising, in addition to the onions, from 0.4% to 0.8% by weight of citric acid; from 0.26% to 0.53% sodium erythorbate; from 0.05 to 0.25% xanthan gum; from 0.05% to 0.1% potassium sorbate; and from 0.01% to 0.05% maltol. The prepared mixture is put into sealed containers and stored in refrigerated conditions. The containers can be opened and closed repeatedly with the remaining prepared onion mixture in the containers substantially retaining it texture, consistency, and freshness for up to 26 weeks.

8 Claims, No Drawings

PREPARATION OF FRESH COMMINUTED ONIONS

BACKGROUND OF THE INVENTION

The present invention relates to a preparation of fresh ground onions which may be refrigerated up to 26 weeks in airtight, sealed containers.

Whole onions can retain their freshness and consistency for long periods of time, but when the onions are cut, enzymes are formed in the onions, and they begin to act on the onions to slowly decompose the onions. Cut or chopped onions can be frozen and stored for long periods of time, but when this is done, the onions are no longer fresh. There have been methods of preparation devised for storing fresh chopped onions.

One known method is a PREPARATION OF FRESH CHOPPED ONIONS WHICH MAY BE DISPENSED FROM TUBES, U.S. Pat. No. 4,430,352, INVENTED BY HERMANN POSTNER, which includes mixing sodium metabisulphite, citric acid, ascorbic acid, a swelling agent, salt, sugar alcohol, vegetable oil, and emulsifying agent together with chopped onions and pouring the preparation in tubes which are heated for a short period of time to from 70 degrees Centigrade to 80 degrees Centigrade. The onions prepared this way retain their consistency over a comparatively long period of time for more than 6 months and may be used as freshly cut onions.

Another known method of preserving fresh cut onions was described and known from German Auslegeschrift, Patent No. 1,178,685, which included pickling the cut onions to deactivate the enzymes which may cause decomposition during storage. This pickling preparation includes adding 6 to 12% common salt, a thickening agent, such as pectin, and ascorbic acid, and citric acid.

None of the prior art preparations of fresh chopped onions describes storing the fresh chopped onions in containers in refrigerated conditions and using few preservatives to preserve the freshness of the chopped onions like that of the present invention which describes storing the fresh chopped onions up to 26 weeks in refrigerated conditions of 4 degrees Celsius.

SUMMARY OF THE INVENTION

This invention relates to a preparation of fresh comminuted onions which can be refrigerated up to 26 weeks in jars. The preparation includes preparing a first stock solution comprising boiling water, citric acid, sodium erythorbate, salt, and maltol and further includes preparing a second stock solution comprising cold water, xanthum gum, and potassium sorbate. The comminuted onions are mixed with the first stock solution which in turn is then mixed with the second stock solution to produce the fresh onion mixture. The citric acid and sodium erythorbate reduces the pH level in the chopped onions to 4.0, which effectively protects against the development of pathogenic bacteria. The potassium sorbate effectively-inhibits mold growth, and the maltol masks the flavor of the fresh chopped onions. The onion mixture is then put into sealed, airtight containers and stored in a refrigerated area at 4 degrees Celsius.

One objective of the present invention is to provide a preparation of fresh comminuted onions which may be refrigerated that preserves the consistency and freshness of the onions up to 26 weeks.

Also, another objective of the present invention is to provide a preparation of fresh chopped onions which may be refrigerated and which uses fewer preservatives than any of the prior art.

Yet, another objective of the present invention is to provide a preparation of fresh chopped onions which remains fresh even if stored in refrigerated conditions.

Further objectives and advantages of the present invention will become apparent as the description proceeds and when taken in conjunction with the detailed description of the invention:

DETAILED DESCRIPTION OF THE INVENTION

The present invention comprises a preparation of fresh comminuted onions which may be refrigerated at 4 degrees Celsius and yet retain their freshness and consistency for up to 26 weeks. The preparation of fresh comminuted onions comprises peeling and grinding whole onions with the yield of each whole onion being approximately 78% and putting approximately 14 kilograms or from 95% to 97% by weight of the ground onions into a mixture of which also comprises approximately from 0.4% to 0.8% by weight of an acidulant which is preferably granular citric acid and approximately from 0.2% to 0.53% by weight of an antioxidant which is preferably granular sodium erythorbate, both of which are used to adjust the pH of the onions to approximately 4.0 down from approximately 5.5 which is the pH of untreated chopped onions and also used to inhibit color change of the onions; and further comprises from 0.05% to 0.25% by weight of a stabilizer which is preferably xanthan gum which effectively binds water to the onions of which water, otherwise, over a period of time, separates from the onion tissue thus resulting in the onion losing texture; and also comprises approximately from 0.02% to 0.1% by weight of a preservative which is preferably potassium sorbate and approximately from 0.01% to 0.05% to 1.0% by weight of a flavor enhancer which is preferably maltol, both of which are used to effectively reduce the bitterness of the onions caused by the release of enzymes in the onions effected by the cutting of the onion tissue; and further comprises approximately from 0.8% to 4% by weight of water and approximately from 0.2% to 0.5% by weight of salt. This mixture is then put into containers which is immediately sealed to prevent oxygen and moisture from getting into the containers. The mixture-filled containers are then stored in a refrigerated unit, area, or cooler at a temperature of preferably 4 degrees Celsius. The treated onions in the containers will retain their consistency and freshness for up to 26 weeks.

The preparation of fresh chopped onions which can be freshly stored in refrigerated conditions for up to 26 weeks includes manually peeling and quartering whole onions with the useable yield of the whole onion being approximately 78 percent. The peeled and quartered onions are then put into a bowl and ground for approximately 25 seconds. Before the ground onions are mixed with the ingredients to produce the preparation, a first stock solution is prepared which includes the steps of boiling a portion of the water or approximately 1.6% of the water, stirring the flavor enhancer in the boiling water until it is completely dissolved, and then mixing the acid, salt, and antioxidant in with the boiling water which contains the dissolved flavor enhancer. A second stock solution is then prepared which includes the steps of blending or mixing the stabilizer with the preservative and then stirring in the remaining unheated water. The ground onions are then put into a mixer along with the first stock solution and mixed at low speed for approximately 2 minutes to effect a first mixture of which ten percent is then mixed with the second stock solution for approximately 15 seconds to effect a second mixture of which is then mixed with the remaining first mixture for approximately one minute to effect a complete onion mixture. The complete onion mixture is then put into sealed containers to prevent oxygen and moisture from getting into the containers and stored in a refrigerated unit, cooler, or area at 4 degrees Celsius.

The refrigerated onion mixture effectively retains its texture, consistency, and freshness for up to 26 weeks. The containers containing the onion mixture can be opened and closed numerous times throughout the 26 weeks with the remaining onion mixture in the containers still maintaining its consistency and freshness. Microbiological tests were conducted on the unopened containers containing the onion mixture over a period of time and were also conducted on containers containing onions which were not treated with the ingredients. These tests were designed to test the quality of the ingredients versus no ingredients added to the onions and the quality of the onion mixture versus the onions without the ingredients added. The tests included testing for standard plate count (SPC), coliform bacteria, lactic acid bacteria, anaerobes, yeast, and mold counts. The following is an example of the onion mixture and a table of the results of the microbiological tests:

EXAMPLE

Comminuted Onion Mixture

| Ingredient | Batch Weight | Percent by Weight |
|---|---|---|
| Onions, peeled & ground | 14 kg | 96.15 |
| citric acid, granular | 70 g | .45 |
| sodium erythorbate, granular | 60 g | .39 |
| xanthan gum (Keltrol RD) | 30 g | .19 |
| potassium sorbate (Sorbistat K) | 10.5 g | .07 |
| maltol (Veltol) | 4.5 g | .03 |
| sodium chloride (salt) | 55 g | .32 |
| boiling water | | 1.60 |
| cold water | | .80 |
| TOTAL | | 100.00 |

TABLE

MICROBIOLOGICAL RESULTS FOR COMMINUTED ONIONS STORED IN CONTAINERS AT 4 DEGREES CELSIUS

| STORAGE | ONION MIXTURE WITH INGREDIENTS (results per gram) | | | ONIONS WITHOUT INGREDIENTS (results per gram) | | |
|---|---|---|---|---|---|---|
| TIME (weeks) | SPC | Coliform Bacteria | Anaerobes | SPC | Coliform Bacteria | Anaerobes |
| 0 | 40 | <10 | <10 | 2600 | 400 | 1400 |
| 2 | 40 | <10 | <10 | 11000 | 17000 | 60000 |
| 3 | 10 | <10 | <10 | 300000 | 24000 | 260000 |
| 4 | <10 | <10 | <10 | 380000 | 140000 | 1600000 |
| 12 | <10 | <10 | <10 | 19000000 | 75000000 | 15000000 |
| 26 | <10 | <10 | <10 | | not tested | |

As shown in table, the bacteria count in the untreated onions stored in containers under the same conditions as the treated onions developed bacteria levels by the fourth week which were unacceptably high for human consumption. As for the treated onions, no SPC, coliform bacteria, or anaerobes were detected at the end of 26 weeks. Further, the color of the treated onions was acceptable at the end of 12 weeks, but tended to be the major limiting factor for such treated onions.

Various changes and departures may be made to the invention without departing from the spirit and scope thereof. Accordingly, it is not intended that the invention be limited to that specifically described in the specification but only as set forth in the claims:

What is claimed is:

1. A preparation of fresh comminuted onions which may be refrigerated comprising:
   (a) from 95% to 97% of ground raw onions;
   (b) from 0.4% to 0.8% of citric acid;
   (c) from 0.2% to 0.53% of sodium erythorbate;
   (d) from 0.05% to 0.25% of xanthan gum;
   (e) from 0.2% to 0.5% of salt;
   (f) from 0.8% to 4% water;
   (g) from 0.02% to 0.1% of a preservative; and
   (h) from 0.01% to 1.0% of maltol.

2. A preparation of fresh comminuted onions according to claim 1, wherein said preparation is for storing in a refrigerated area at approximately 4 degrees Celsius.

3. A process for the preparation of fresh comminuted onions which comprises the steps of:

providing from 95% to 97% of ground raw onions from 0.4% to 0.8% of citric acid, from 0.2% to 0.53% of sodium erythorbate, from 0.05% to 0.25% of xanthan gum from 0.2% to 0.5% of salt, (f) from 0.8% to 4% water, from 0.02% to 0.1% of a preservative, and from 0.01% to 1.0% of maltol;

heating a portion of said water;

mixing quantities of said citric acid, said sodium erythorbate, said salt, said heated water, and said maltol into a first stock solution;

mixing quantities of said remaining water, said xanthum gum, and said preservative into a second stock solution;

mixing quantities of said ground onion with said first stock solution into a first mixture;

mixing said first mixture with said second stock solution into a second mixture;

putting said second mixture into a container; and putting said mixture-filled container in a refrigerated area.

4. A process for the preparation of fresh comminuted onions according to claim 3, wherein the step of heating a portion of said water further includes bringing said portion of water to a boil.

5. A process for the preparation of fresh comminuted onions according to claim 4, wherein the step of mixing quantities of said citric acid, said sodium erythorbate, said salt, said heated water, and said maltol into a first stock solution further includes stirring said maltol in said boiling water until said maltol dissolves.

6. A process for the preparation of fresh comminuted onions according to claim 5, wherein after said maltol is dissolved in said boiling water, the process further includes mixing quantities of said citric acid, said sodium erythorbate, and said salt in said boiling water containing said maltol.

7. A process for the preparation of fresh comminuted onions according to claim 3, wherein said container is sealed to substantially prevent oxygen and water from getting into said container.

8. A process for the preparation of fresh comminuted onions according to claim 3, further includes putting said container in said refrigerated area having a temperature of approximately 4 degrees Celsius.

* * * * *